Jan. 20, 1959  H. P. SMITH  2,869,653
GAUGE WHEEL FOR TWO-WAY PLOW
Filed Nov. 14, 1955  3 Sheets-Sheet 1

INVENTOR
HIRAM P. SMITH
ATTORNEY

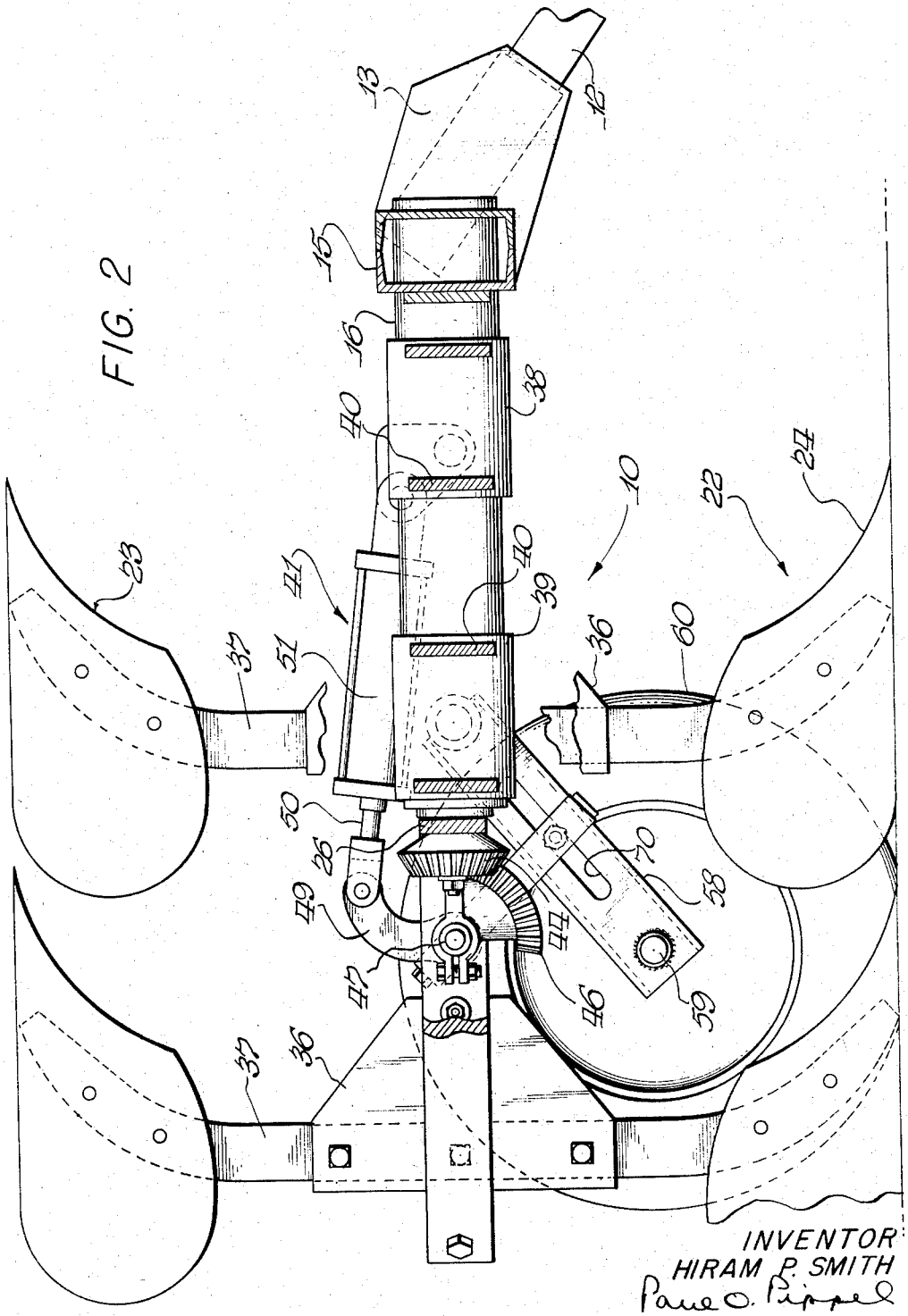

Jan. 20, 1959  H. P. SMITH  2,869,653
GAUGE WHEEL FOR TWO-WAY PLOW
Filed Nov. 14, 1955  3 Sheets-Sheet 3
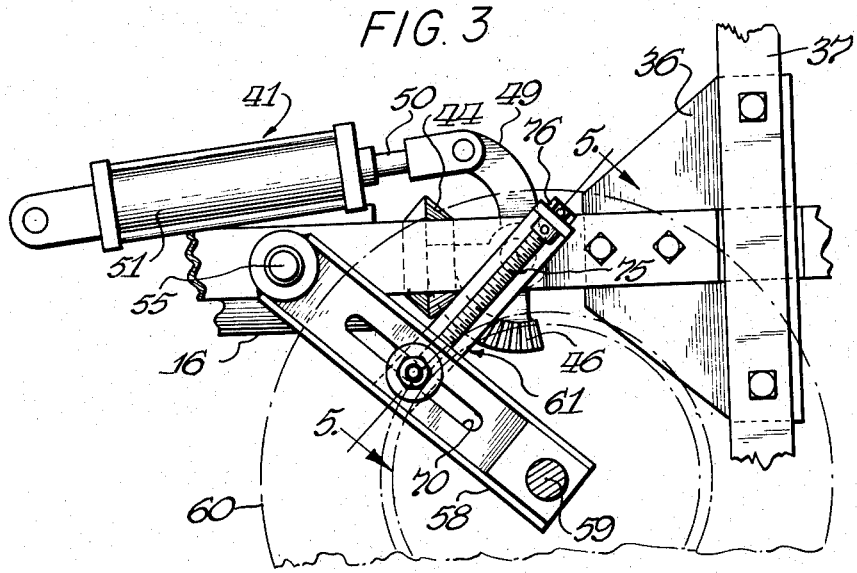
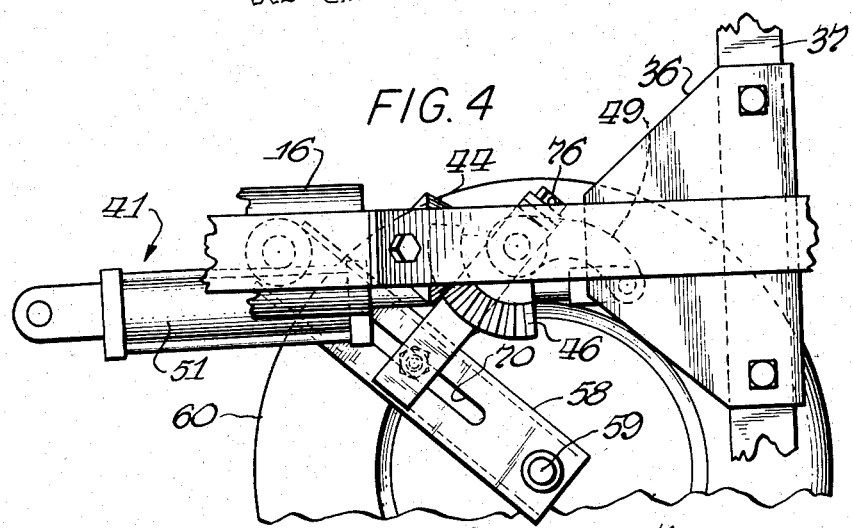
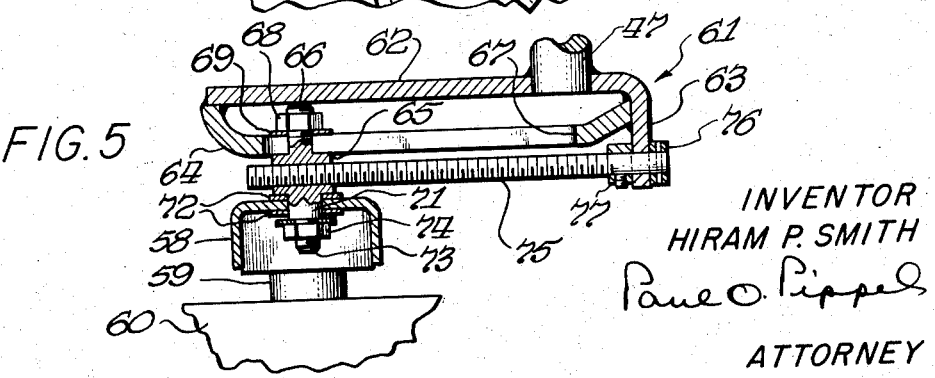
INVENTOR
HIRAM P. SMITH
ATTORNEY

United States Patent Office 2,869,653
Patented Jan. 20, 1959

2,869,653

GAUGE WHEEL FOR TWO-WAY PLOW

Hiram P. Smith, Chicago, Ill., assignor to International Harvester Company, a corporation of New Jersey Application November 14, 1955, Serial No. 546,684

7 Claims. (Cl. 172—212)

This invention relates to agricultural implements and particularly to a two-way plow of the type wherein alternately operating left and right hand plow units are mounted upon a carrier which is rotatable about a longitudinal axis to alternately place the plow units in operation. More specifically, the invention concerns a novel gauge wheel assembly for regulating the depth of operation of each of the plow units.

An object of the invention is the provision of an improved gauge wheel assembly for a two-way plow which alternately functions to gauge the depth of operation of each plow unit.

Another object of the invention is the provision of an improved single gauge wheel assembly arranged to alternately gauge the operation of the alternately operating plow units, wherein the gauge wheel is moved with respect to the tool-carrying frame from one operating position to another for gauging the plow unit in operation.

Another object of the invention is the provision of improved gauge means for a two-way plow of the type wherein alternately operating plow units are mounted on a frame rotatable about a longitudinal axis to alternately place the plow units in operation, said gauge means being movable from one position to the other by the same means that rotates the frame.

Other objects and advantages of the invention will become clear from the following details of description when read in conjunction with the accompanying drawings, wherein:

Figure 2 is a section on the line 2—2 of Figure 1;

Figure 3 is a sectional detail showing the position of the gauge wheel and the position of the mounting parts when gauging the right hand plow unit;

Figure 4 is a view similar to Figure 3 but showing the gauge wheel in position for gauging the left hand plow unit after the tool-carrying frame has been rotated; and Figure 5 is a section taken on the line 5—5 of Figure 3.

Figure 1:
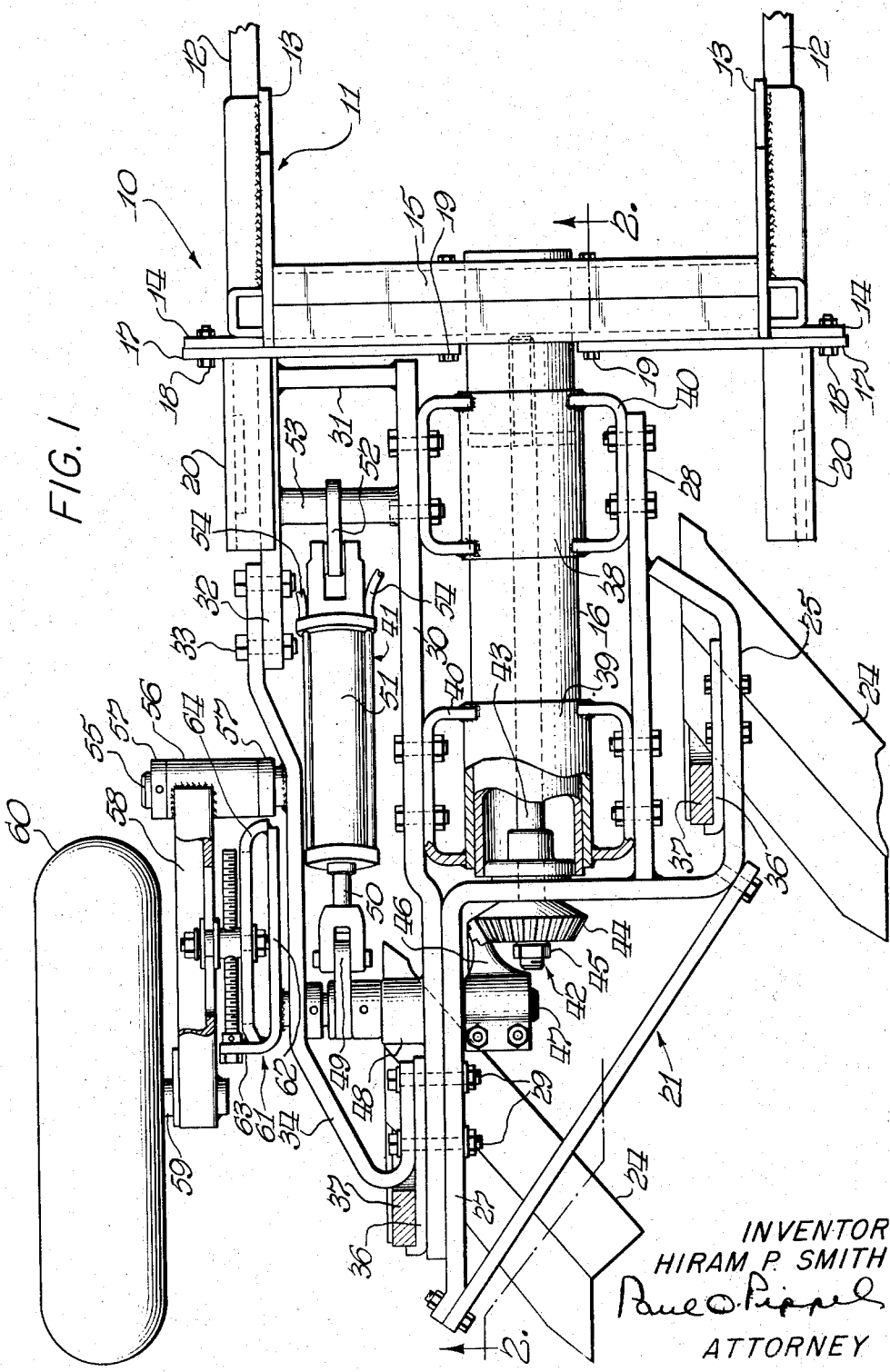
Figure 1 is a plan view, partly in section, of a roll-over plow embodying the features of this invention adapted to be mounted upon a tractor to be carried thereby.

Referring to the drawings, the implement with which this invention is concerned, as pointed out before, is a roll-over type two-way plow generally designated by the numeral 10 adapted for mounting upon a tractor, not shown. At the forward end of the implement is a hitch structure 11 comprising laterally spaced attaching members 12 affixed at their rear ends to laterally spaced angle plates 13. Plates 13 have outwardly directed flanges 14 and are affixed to the ends of a transversely extending main supporting frame 15.

Forming a part of the main support 15 of the plow is a longitudinally extending tubular beam member 16, affixed at its forward end to the rectangularly shaped support 15 and extending rearwardly therefrom. A pair of transversely extending plates 17 are secured to the rear face of the support 15 by bolts 18 and 19, and each of these plates has welded thereto and extending rearwardly therefrom a stop member 20, the purpose of which will hereinafter become clear.

The implement 10 also includes a tool-carrying sub-frame 21 having thereon right and left hand plow units 22 and 23, respectively, consisting of two plow bottoms each, the plow bottoms being designated by the numeral 24. Tool-carrying sub-frame 21 includes a frame bar 25 having a transversely extending portion 26 and a rear longitudinally extending portion 27. The forward end of frame bar 25 is bent inwardly and is welded to a brace 28 which extends longitudinally and the rear end of which is welded to the transverse portion 26 of the frame bar. The rear end 27 of frame bar 25 has secured thereto by bolts 29 the rear end of a longitudinally extending frame bar 30, the forward end of which is connected by a brace 31 to another frame bar 32 which, in turn, is connected by bolts 33 to a frame bar 34, the rear end of which is bent and secured to the bar 30 by bolts 29.

The right and left hand plow units 22 and 23 are secured to the tool-carrying frame 21 by means of triangularly shaped plates 36 affixed to the frame bars 25 and 30 and to which are secured upright plow standards 37 upon the ends of which are mounted the right and left hand plow bottoms 24.

Tool carrier 21 is rotatably mounted upon the main supporting frame through the intermediary of bearing members 38 and 39, rotatably mounted at longitudinally spaced locations upon the longitudinally extending tubular beam 16. Bearing members 38 and 39 are provided with laterally extending U-shaped ears 40 extending from opposite sides of the bearings and secured to the frame bar 30 and brace 28. At this point it should be clear that by virtue of the mounting of the tool frame 21 upon the beam 16 through the intermediary of bearings 38 and 39, the tool-carrying sub-frame is capable of rotating bodily 180° about the axis of the beam 16 from a position such as is indicated in Figure 2 with the right hand plow bottoms 24 in operation, to an alternate operating position with the other set of plow bottoms 24 in operation. The rotation of the tool carrier 21 carrying the plow units 24 and 25 is limited by the stops 20, the bar 32 being shown in Figure 1 as having engaged the stop 20 on the left hand side of the implement frame. Upon rotation of the tool carrier 21 about the axis of the longitudinally extending beam 16, 180°, to place the left hand plow unit 23 in operation, the bar 32 engages the right hand stop 20 to limit the rotation of the carrier.

In Figures 1 and 2 the plow unit 22 is shown in operation. In order to reverse the plowing operation and place the left hand plowing unit 23 in operation while the right hand unit 22 is elevated, the frame 21 is rotated about the axis of beam 16 in a clockwise direction, as viewed from the front of the implement, until bar 32 engages right hand stop 20. Rotation of the plow-carrying frame 21 is accomplished by power operated apparatus in the form of a hydraulic ram 41, acting through power transmission means 42 to turn the tool frame about the axis of beam 16.

Interiorly of beam 16 is a shaft 43 affixed to the beam and projecting from the rear end thereof. Shaft 43 extends through a suitable opening provided in the transverse frame bar 26 and has mounted upon its end a bevel gear 44 held in place by a nut 45. Gear 44 meshes with a segment gear 46 mounted upon the end of a transverse rackshaft 47 rockably carried in one or more bearings 48 mounted on the frame 21. Shaft 47 has affixed thereto a rock arm 49, and the end of the shaft opposite the segment gear 46 extends through an opening provided in the frame bar 34.

Rock arm 49 is connected to the piston rod 50 of the hydraulic ram 41, the piston rod being slidable in a cylinder 51 which is anchored to a lug 52 affixed to a transverse brace 53 extending between the bars 27 and 32. Fluid under pressure is supplied for operating ram 41 through hose lines 54, preferably from a source on the tractor, not shown, upon which the implement is mounted. Operation of ram 41 acts through rockshaft 47 and segmental gear 46 to cause the latter to travel around stationary bevel gear 44 and rotate the tool carrier 21 from the positions shown in Figures 1 and 2 until the left hand plow unit 23 is brought into operating position, and frame bar 32 engages the right hand stop 20 on the main supporting frame.

For purposes of economy and simplicity it is desirable that a single gauging means be caused to function for the two plowing units. It is also desirable that this gauging means be adjustable with respect to the plow unit in operation and that this adjustment be retained when the position of the gauge means is reversed to place it in operation with respect to the alternate plow bottom. Therefore, applicant has provided a stub axle 55 extending laterally from and having its inner end welded to frame bar 34, and upon which is rotatably mounted a sleeve member 56 held in place by collars 57 and having affixed thereto and extending rearwardly therefrom a wheel-carrying arm 58, the rear end of which has secured thereto another stub axle 59 upon which is rotatably mounted a gauge wheel 60. Since gauge wheel 60 is mounted upon tool carrier 21 it travels therewith from a position on one side of the axis of beam 16, as indicated in Figure 3, to a position on the other side thereof as indicated in Figure 4.

The end of shaft 47 extending beyond frame bar 34 has affixed thereto a lever 61 having an arm portion 62 extending forwardly and downwardly alongside wheel-carrying arm 58 and having an outwardly angled base portion 63 connected by a brace 64 with the outer end of arm 62 and spaced therefrom. Lever arm 61 is connected to wheel arm 58 through the intermediary of a connecting member in the form of a block 65 having a reduced and threaded bolt portion 66 slidably receivable in a slot 67 provided in brace 64 of lever arm 61, a nut 68 and a washer 69 being provided to hold the bolt in the slot.

Wheel arm 58 is in the form of a channel, as clearly viewed in Figure 5, and it is provided with a slot 70 in which is slidably received another reduced portion 71 of the block 65, washers 72 being provided on the reduced portion 71 to engage the shoulder of block 65 and the base of channel member or arm 58. Block 65 has a further reduced threaded bolt portion 73 having a nut 74 thereon engaging the shoulder of portion 71.

From the foregoing it will be noted that connecting member 66 is slidable relative to arm 58 as well as lever 61. It will also be clear that rocking of shaft 47 by operation of ram 41 also rocks lever arm 61 and, through connecting member 65, transmits motion to wheel arm 58 to swing the latter vertically with respect to the implement frame to vary the vertical position of the tool carrier relative to the gauge wheel and adjust its depth of operation. It will also be observed that upon operation of the hydraulic ram 41 to rotate the tool carrier 21 about its longitudinal axis to place an alternate plow unit in operation while the other plow unit is raised to an inoperative position, corresponding swinging of the gauge wheel arm 58 occurs through the action of lever 61 while the gauge wheel is being carried bodily with the tool carrier from the position indicated in Figure 1 with the wheel on the left hand side of beam 16, to a position on the right hand side thereof to gauge the other set of plow bottoms. When wheel 60 is swung to the other side of the axis of axle 55 during rotation of the tool carrier the relative position of the arm 58 and the lever 61 is resumed in the new position, as indicated in Figures 3 and 4.

For a particular setting of lever 61 relative to wheel arm 58, the operating depth of the working tools remains the same and this operating depth is retained when the alternatively operating plow unit is moved into position. Adjustment of the operating depth of the tools is made by varying the position of gauge wheel 60 relative to the tool-carrying frame 21. This adjustment is accomplished by the provision of an elongated threaded bolt or rod 75 rotatably received in an opening provided in the part 63 of lever arm 61 and having a head 76 thereon by which the rod may be turned. Rod 75 is held against displacement relative to the part 63 by the provision of a collar 77, and the threaded part of the rod is received in a threaded opening extending transversely through the connecting block 65. Thus, rotation of threaded rod 75 moves connecting member 65 relative to slot 67 in lever arm 61 to vary the effective length of the latter.

In the position of the parts shown in Figure 5 connecting member 65 is farthest from the axis of shaft 47 and the lever arm has its greatest effective length. In this position of the parts gauge wheel 60 is farthest from the tool carrier 21 in a downward direction so that the plow bottoms in operation penetrate to the least depth in the soil. As connecting member 65 is adjusted nearer the axis of shaft 47 gauge wheel 60 moves upwardly with respect to the tool-carrying frame and the operating depth of the earth-working tools becomes correspondingly greater until the greatest depth is reached when arm 58 is substantially parallel and lies alongside frame bar 34 of the tool carrier, and connecting member 65 is substantially in alignment with the axis of shaft 47. At this point, of course, the effective length of lever arm 61 is zero and no movement is imparted to gauge wheel 60 when the tool carrier is rotated.

It is believed that the operation of the roll-over two-way plow and the novel gauge wheel mounting of this invention will be clearly understood from the foregoing description. It should likewise be understood that the invention has been described in its preferred embodiment and that modifications may be made therein without departing from the spirit of the invention or the scope of the appended claims.

What is claimed is:

1. In a two-way plow including a tool-carrying frame movable between alternate operating positions for left and right hand plowing, a gauge wheel, and means for mounting said gauge wheel on the tool-carrying frame for movement to alternate positions corresponding to the positions of the tool-carrying frame, comprising a horizontal rockable axle mounted on said frame, a downwardly extending wheel-supporting arm mounted on said axle, said arm being vertically adjustable about the axis of said axle to vary the position of the wheel with respect to said tool-carrying frame, and means for adjusting said arm including a shaft on the frame parallel to said axle, a downwardly extending arm on said shaft, power operated means for rocking said shaft, means pivotally connecting said shaft arm to said axle arm at a location spaced from the respective axes of said axle and shaft, whereby power for rocking said shaft arm is transmitted to said axle arm to swing the latter to vertically move the wheel, means operable independently of said power operated means for varying the distance from the axis of said axle of the means pivotally connecting said shaft arm to said axle arm, whereby the vertical movement of the gauge wheel relative to the tool-carrying frame is varied, and means for adjusting the means pivotally connecting said shaft arm to said axle arm from a location adjacent the end of said shaft arm, where the greatest lever arm is provided for swinging said axle arm to a location substantially in alignment with the axis of said axle, where rocking of the shaft arm is ineffective to swing the wheel-carrying axle arm.

2. The invention set forth in claim 1, wherein said means pivotally connecting said shaft arm to said axle arm is held in selected positions between the end of said axle arm and the axis thereof, and said connecting means has a slidable connection with said axle arm.

3. The invention set forth in claim 2, wherein the means pivotally connecting said shaft arm to said axle arm includes a pivot member forming a connection between said arms and a threaded rod secured to the shaft arm parallel thereto, said shaft arm having a slot therein to receive said pivot member, and said member having a threaded opening therein to adjustably receive said threaded rod.

4. In an agricultural implement including a tool-carrying frame, a gauge wheel, and means for mounting the gauge wheel on the frame comprising an axle on the frame, a wheel-carrying arm mounted on said axle for vertical adjustment about the axis thereof to selected gauging positions, and means for vertically adjusting said wheel arm comprising a rockshaft on the frame spaced from said axle, a lever arm mounted on said rockshaft, means for rocking said rockshaft, means operatively connecting said lever arm to said wheel arm for swinging the latter in response to rocking said lever arm, and means for adjusting the effective length of said lever arm to vary the extent of swinging movement of the wheel-carrying arm, said wheel and lever arms having slots therein lengthwise thereof, said adjusting means including a slidable member interconnecting said arms and slidably received in both said slots and a threaded rod affixed to one of said arms parallel to the associated slot, said slidable member having a threaded opening therein to adjustably receive said rod.

5. In a two-way plow including a support and a tool-carrying frame having alternately operating plow units thereon mounted on said support for rotation 180° about a longitudinal axis to alternately place one plow unit in operation while the other is rendered inoperative, gauge wheel means movable with the tool-carrying frame about said longitudinal axis to alternately serve as a gauging means for the respective plow units, comprising a wheel-supporting arm mounted on said frame for swinging in a vertical plane from a gauging position with respect to one of said plow units to a gauging position with respect to the other said plow unit, rockable power transmission means on the tool-carrying frame cooperative with said support and reacting thereagainst to rotate the tool-carrying frame to alternately place the plow units in operation upon rocking said power transmission means, means operatively connected to said power transmission means for rocking the latter, and means operatively connecting said power transmission means to said wheel-supporting arm for swinging the latter from a gauging position with respect to one said plow unit to a gauging position with respect to the other plow unit in response to the rotation of said tool-carrying frame.

6. The invention set forth in claim 5, wherein said means operatively connecting said power transmission means to said wheel-supporting arm includes a lever arm mounted on the tool-carrying frame coaxial with said rockable means, and means operatively connecting said lever arm to said wheel arm for swinging the latter in response to rocking said rockable means.

7. The invention set forth in claim 6, wherein said connecting means includes a member interconnecting said lever arm and said wheel arm and means for adjusting said member lengthwise of said lever arm to vary the effective length thereof.

References Cited in the file of this patent

UNITED STATES PATENTS

| | | |
|---|---|---|
| 1,386,870 | Heylman | Aug. 9, 1921 |
| 2,228,734 | Scarlett | Jan. 14, 1941 |
| 2,532,577 | Silver et al. | Dec. 5, 1950 |
| 2,580,100 | Johansen | Dec. 25, 1951 |
| 2,582,337 | Kaltoft | Jan. 15, 1952 |
| 2,659,284 | Pursche | Nov. 17, 1953 |

FOREIGN PATENTS

| | | |
|---|---|---|
| 823,960 | Germany | Dec. 6, 1951 |